US009411803B2

(12) United States Patent
Assulin et al.

(10) Patent No.: US 9,411,803 B2
(45) Date of Patent: Aug. 9, 2016

(54) RESPONDING TO NATURAL LANGUAGE QUERIES

(71) Applicant: Hewlett-Packard Development Company, L.P., Houston, TX (US)

(72) Inventors: Ohad Assulin, Yehud (IL); Ira Cohen, Yehud (IL); Eli Mordechai, Yehud (IL); Boaz Shor, Yehud (IL); Alon Sade, Yehud (IL)

(73) Assignee: Hewlett Packard Enterprise Development LP, Houston, TX (US)

( * ) Notice: Subject to any disclaimer, the term of this patent is extended or adjusted under 35 U.S.C. 154(b) by 710 days.

(21) Appl. No.: 13/629,885

(22) Filed: Sep. 28, 2012

(65) Prior Publication Data

US 2014/0095145 A1    Apr. 3, 2014

(51) Int. Cl.
| G06F 7/00 | (2006.01) |
| G06F 17/30 | (2006.01) |
| G06F 17/27 | (2006.01) |
| G10L 15/18 | (2013.01) |
| G10L 15/00 | (2013.01) |
| G10L 15/26 | (2006.01) |
| G10L 19/12 | (2013.01) |
| G10L 21/00 | (2013.01) |
| G06F 17/28 | (2006.01) |

(52) U.S. Cl.
CPC .......... *G06F 17/28* (2013.01); *G06F 17/30401* (2013.01)

(58) Field of Classification Search
CPC ............... G06F 17/30864; G06F 17/30427; G06F 17/30867; G06F 17/3064; G06F 17/2785; G06F 17/24; G10L 15/22; G10L 15/265; G10L 15/12

USPC .............. 704/9, 257; 709/217; 707/759, 723, 707/766, 728, 761, 754; 715/261
See application file for complete search history.

(56) References Cited

U.S. PATENT DOCUMENTS

| 5,386,556 | A * | 1/1995 | Hedin et al. | |
| 6,571,239 | B1 * | 5/2003 | Cole et al. | |
| 6,766,320 | B1 | 7/2004 | Wang et al. | |
| 7,409,336 | B2 | 8/2008 | Pak et al. | |
| 7,720,674 | B2 | 5/2010 | Kaiser et al. | |
| 7,912,849 | B2 * | 3/2011 | Ohrn et al. | 707/761 |
| 8,250,192 | B2 | 8/2012 | Bowerman | |
| 8,650,031 | B1 * | 2/2014 | Mamou et al. | 704/235 |
| 8,762,152 | B2 * | 6/2014 | Bennett et al. | 704/257 |

(Continued)

OTHER PUBLICATIONS

Alessandra Giordani and Alessandro Moschitti, "Semantic: Mapping Between Natural Language Questions and SQL Queries via Syntactic Pairing," University of Trento, 2010, pp. 1-15, Available at: <disi.unitn.it/moschitti/articles/NLDB09.pdf>.

(Continued)

*Primary Examiner* — Pierre-Louis Desir
*Assistant Examiner* — Anne Thomas-Homescu
(74) *Attorney, Agent, or Firm* — Hewlett Packard Enterprise Patent Department

(57) ABSTRACT

Disclosed herein are a system, non-transitory computer-readable medium, and method for responding to natural language queries. Keywords likely to appear in a natural language query are determined and each likely keyword is associated with a module. A response to a natural language query comprises information generated by each module associated with a likely keyword appearing in the natural language query.

17 Claims, 4 Drawing Sheets

(56) References Cited

U.S. PATENT DOCUMENTS

| | | | |
|---|---|---|---|
| 2004/0221235 A1* | 11/2004 | Marchisio et al. | 715/534 |
| 2005/0027704 A1* | 2/2005 | Hammond et al. | 707/5 |
| 2005/0267871 A1* | 12/2005 | Marchisio et al. | 707/3 |
| 2007/0073831 A1* | 3/2007 | Oscherov et al. | 709/217 |
| 2007/0156669 A1 | 7/2007 | Marchisio et al. | |
| 2008/0059416 A1* | 3/2008 | Forbes et al. | 707/2 |
| 2009/0006216 A1* | 1/2009 | Blumenthal et al. | 705/26 |
| 2009/0070103 A1* | 3/2009 | Beggelman et al. | 704/9 |
| 2009/0077047 A1* | 3/2009 | Cooper et al. | 707/4 |
| 2009/0089044 A1* | 4/2009 | Cooper et al. | 704/9 |
| 2010/0017382 A1* | 1/2010 | Katragadda et al. | 707/4 |
| 2010/0185643 A1* | 7/2010 | Rao et al. | 707/759 |
| 2010/0228693 A1* | 9/2010 | Dawson et al. | 706/12 |
| 2011/0025516 A1* | 2/2011 | Johnson et al. | 340/657 |
| 2011/0314010 A1* | 12/2011 | Ganti et al. | 707/728 |
| 2012/0078889 A1* | 3/2012 | Chu-Carroll et al. | 707/723 |
| 2012/0078891 A1* | 3/2012 | Brown et al. | 707/723 |
| 2012/0136649 A1* | 5/2012 | Freising et al. | 704/9 |
| 2012/0158702 A1* | 6/2012 | Kumar et al. | 707/723 |
| 2012/0158765 A1* | 6/2012 | Kumar et al. | 707/766 |
| 2014/0006012 A1* | 1/2014 | Zhou et al. | 704/9 |
| 2014/0019462 A1* | 1/2014 | Heck et al. | 707/754 |
| 2014/0046934 A1* | 2/2014 | Zhou et al. | 707/723 |
| 2014/0236579 A1* | 8/2014 | Kurz | 704/9 |
| 2014/0258286 A1* | 9/2014 | Brown et al. | 707/728 |

OTHER PUBLICATIONS

Alessandra Gordani and Alessandro Moschitti, "Syntactic Structural Kernels for Natural Language Interfaces to Databases," University of Trento, 2009, pp. 1-16, Available at: <livingknowledge.europarchive.org/images/publications/PKDD09.pdf>.

Quarteroni, S., Question Answering, Semantic Search and Data Service Querying, Proceedings of the KRAQ11 Workshop, Chiang Mai, Thailand, Nov. 12, 2011 (8 pages).

* cited by examiner

| 302 | Integer | Get employee ID (String First name, String Last name) |
| 304 | String | Get employee address (Integer ID) |
| 306 | String | Get customer address (String First name, String Last name |
| 308 | String | Get employee salary (Integer ID) |

*Fig. 3A*

| 311 | LIVE | Get employee address |
| 312 | LIVE | Get customer address |
| 313 | Street | Get employee address |
| 314 | Street | Get customer address |
| 315 | MARY, JONES | Get employee ID (First name, Last name) |
| 316 | MARY, SMITH | Get employee ID (Last name, First name) |
| 317 | MAKE | Get employee salary |
| 318 | MONEY | Get employee salary |
| 319 | EMPLOYEE | Get employee address |
| 320 | EMPLOYEE | Get employee salary |
| 322 | EMPLOYEE | Get employee ID |
| 323 | CUSTOMER | Get customer address |

*Fig. 3B*

RESPONDING TO NATURAL LANGUAGE QUERIES

BACKGROUND

Natural language interfaces may be utilized to translate natural language queries into a database query using structured query language ("SQL"). Such a translation may be carried out using a semantic model that defines how the data is arranged in the database. The semantic model may comprise associations between certain keywords and database attributes (e.g., customer or employee). In turn, the database attributes may be associated with a database property type (e.g., table or column). These associations of the semantic model may be adjusted to reflect changes in the underlying database model.

BRIEF DESCRIPTION OF THE DRAWINGS

FIG. 3A is a working example of modules in accordance with the present disclosure.

FIG. 3B is a working example of a semantic model that associates keywords with the modules in FIG. 3A.

DETAILED DESCRIPTION

Introduction:

As noted above, associations stored in semantic models may be used to translate natural language queries into SQL. However, not all databases are relational databases that respond to SQL queries. In some examples, data may be stored in a real-time memory database or some other format not obtainable via SQL. In these instances, modules or application programming interfaces ("API") may be developed to retrieve the data via a computer program. Thus, a database structure may be hidden such that the data is only accessible by way of APIs. Finally, some data may not be stored in a database but instead generated in real time by a module. Without knowledge of a database structure, it is difficult to generate a semantic model to respond to natural language queries.

In view of the foregoing, aspects of the present disclosure provide techniques for responding to natural language queries when a database structure is unknown. In one aspect, keywords likely to appear in a natural language query are determined and each likely keyword is associated with a module. In another aspect, a response to a natural language query comprises information generated by each module associated with a likely keyword appearing in the natural language query. The aspects, features and advantages of the disclosure will be appreciated when considered with reference to the following description of examples and accompanying figures. The following description does not limit the disclosure; rather, the scope of the disclosure is defined by the appended claims and equivalents. The present disclosure is broken into sections. The first section, labeled "Environment," describes an illustrative environment in which various examples may be implemented. The second section, labeled "Components," describes various physical and logical components for implementing various examples. The third section, labeled "Operation," describes illustrative processes in accordance with aspects of the present disclosure.

Figure 1:
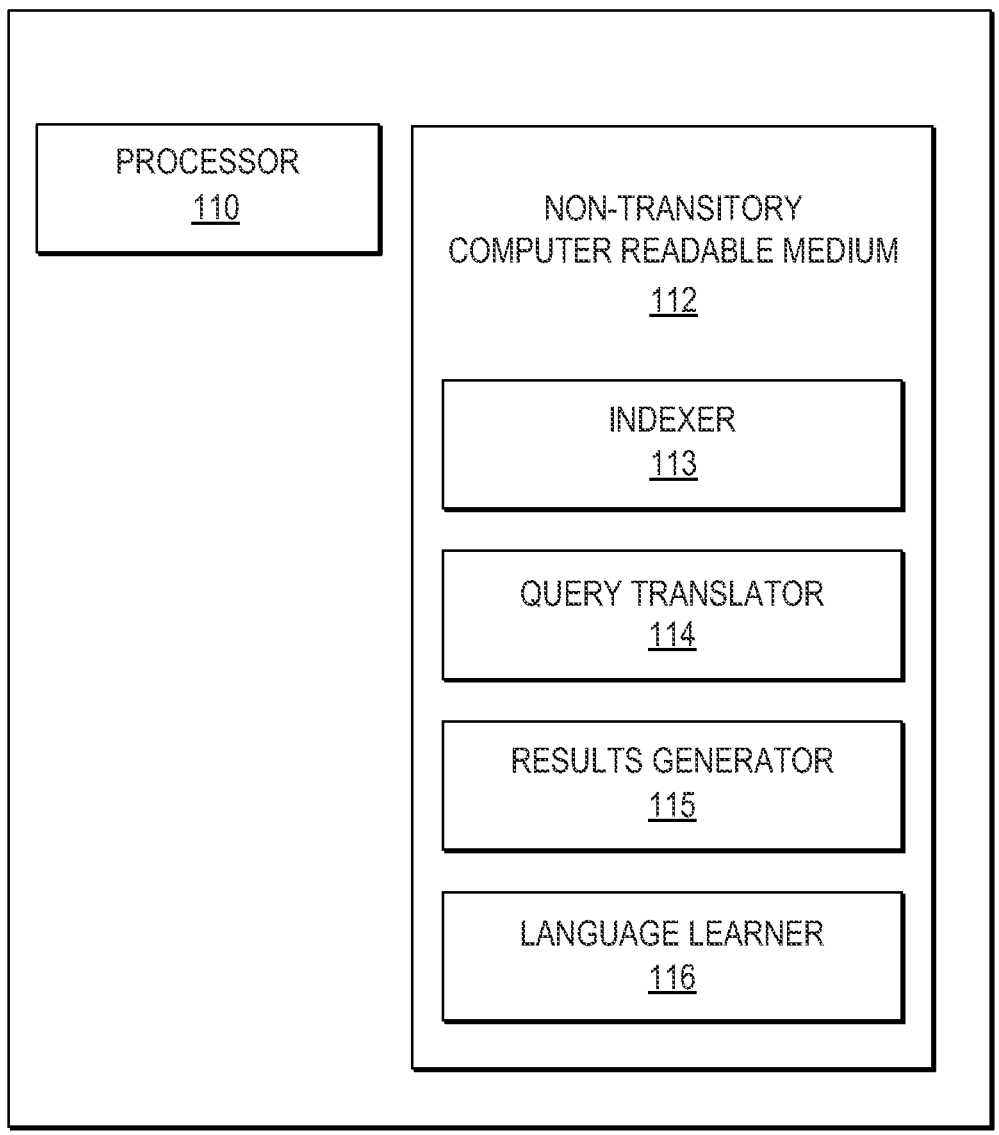
FIG. 1 is an illustrative system in accordance with aspects of the disclosure.

Environment:

FIG. 1 presents a schematic diagram of an illustrative computer apparatus 100 that may be used to execute the techniques disclosed herein. Computer apparatus 100 may comprise any device capable of processing instructions and transmitting data to and from other computers, including a laptop, a full-sized personal computer, a high-end server, or a network computer lacking local storage capability. Computer apparatus 100 may include all the components normally used in connection with a computer. For example, it may have a keyboard, a mouse and/or various other types of input devices such as pen-inputs, joysticks, buttons, touch screens, etc., as well as a display, which could include, for instance, a CRT, LCD, plasma screen monitor, TV, projector, etc.

The computer apparatus 100 may also contain a processor 110, which may be any number of well known processors, such as processors from Intel® Corporation. In another example, processor 110 may be an application specific integrated circuit ("ASIC"). Non-transitory computer readable medium ("CRM") 112 may store instructions that may be retrieved and executed by processor 110. As will be discussed in more detail below, the instructions may include an indexer 113, a query translator 114, a results generator 115, and a language learner 116. In one example, non-transitory CRM 112 may be used by or in connection with any instruction execution system that can fetch or obtain the logic from non-transitory CRM 112 and execute the instructions contained therein. Non-transitory computer readable media may comprise any one of many physical media such as, for example, electronic, magnetic, optical, electromagnetic, or semiconductor media. More specific examples of suitable non-transitory computer-readable media include, but are not limited to, a portable magnetic computer diskette such as floppy diskettes or hard drives, a read-only memory ("ROM"), an erasable programmable read-only memory, a portable compact disc or other storage devices that may be coupled to computer apparatus 100 directly or indirectly. Alternatively, non-transitory CRM 112 may be a random access memory ("RAM") device or may be divided into multiple memory segments organized as dual in-line memory modules ("DIMMs"). The non-transitory computer-readable medium ("CRM") 112 may also include any combination of one or more of the foregoing and/or other devices as well.

Although FIG. 1 functionally illustrates one processor and one non-transitory CRM as being within the same block, it will be understood that these components may actually comprise at least one or multiple processors and memories that may or may not be stored within the same physical housing. For example, any one of the memories may be a hard drive or other storage media located in a server farm of a data center. Accordingly, references to a processor, computer, or memory will be understood to include references to a collection of processors, computers, or memories that may or may not operate in parallel.

Components:

The instructions stored in non-transitory CRM 112 may comprise any set of instructions to be executed directly (such as machine code) or indirectly (such as scripts) by the processor(s). In that regard, the terms "instructions," "modules" and "programs" may be used interchangeably herein. The instructions may be stored in any computer language or format, such as in object code or modules of source code. Furthermore, it is understood that the instructions may be implemented in the form of hardware, software, or a combination of hardware and software and that the examples herein are merely illustrative.

Indexer 113 may determine which keywords are likely to appear in a natural language query and may associate each likely keyword with a module of a plurality of modules likely to provide an accurate answer to the natural language query. In one example, a module may be defined as an API whose underlying code obtains or generates data. Query translator 114 may determine whether at least one of the likely keywords determined by indexer 113 appears in a received natural language query. Results generator 115 may respond to the received natural language query with information generated by each module associated with a likely keyword appearing in a received natural language query. Language learner 116 may alter an association between a likely keyword and a module, when it is determined that the altered association is more likely to trigger an accurate response to a natural language query.

The modules exposed to indexer 113 may be preselected by an administrator or a developer of the modules. Indexer 113 may determine a keyword likely to appear in a natural language query based on source code text of a module. In one example, indexer 113 may convert the source code text of each module and parameters thereof to likely keywords when possible. Such conversion may be accomplished utilizing the "Camel Case" standard. Indexer 113 may determine variations of every likely keyword in order to achieve better compatibility with different usages of a word. This may be carried out with the porter stemming algorithm (e.g. status and statuses have the same stem). In a further example, indexer 113 may also associate the modules with synonyms of determined keywords to increase the range of keywords that may likely appear in a natural language query. Indexer 113 may receive a feed of such synonyms from, for example, the WordNet English database.

In yet a further example, indexer 113 may associate each likely keyword with an attribute of a module based on metadata associated with each attribute. An attribute of the module may be detected from the source code text. Examples of an attribute may be the module's signature or parameters of the module. Each module name and parameter name may be associated with a likely keyword based on an analysis of metadata regarding the data types, relationships, and possible values thereof. For example, a module's parameter whose type is integer may be associated with a likely keyword that is actually a number. Finally, other keywords may comprise data that may be sought after by a natural language query. For example, if a system contains employee data and an employee is named "Mary Jones," the first name "Mary" and the last name "Jones" may each be keywords associated with an attribute of a module enabled to generate information about the employee "Mary Jones."

The results generator 115 may rank the information returned by each module based on a probability that the information is a correct response to the natural language query. The probability may be partially based on an amount of information returned by each module. For example, if a module does not return any results, its rank may be lower. In a further example, the probability may be based on a number of associations between each module and likely keywords appearing in the received natural language query. For example, if a module is associated with five keywords in a received natural language query, it may be ranked higher than a module associated with one keyword.

In another example, results generator 115 may rank the information returned by each module using a context free grammar. Words in a received natural language query may be analyzed and compared to sentences of the context free grammar. The sentences may be generated and stored by language learner 116. Some of the sentences in the context free grammar may comprise previously received natural language queries. In one example, the context free grammar may be a stochastic or probabilistic context free grammar. In the probabilistic or stochastic context free grammar, each sentence thereof may be associated with a probability. Such probability may reflect how frequently each sentence triggered a correct answer to a previously received natural language query. In a further example, results generator 115 may use the Cocke-Younger-Kasami ("CYK") algorithm to rank the relevant sentences of the context free grammar.

In another example, language learner 116 may comprise pattern learning logic to assign a probability to each association between keywords and modules. The probability assigned to each association may also reflect how frequently each association triggered a correct answer to a previously received natural language query.

Figure 2:
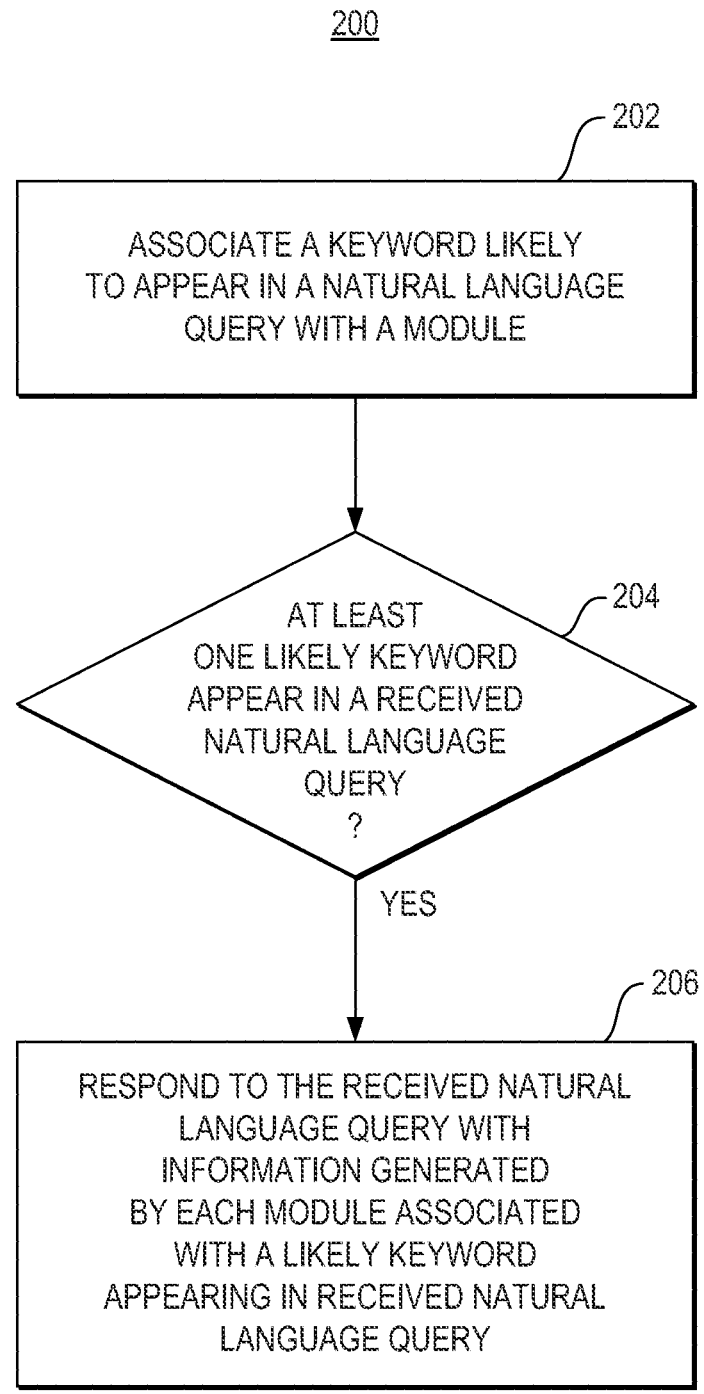
FIG. 2 is an example of a flow diagram in accordance with aspects of the disclosure.
Figure 4:
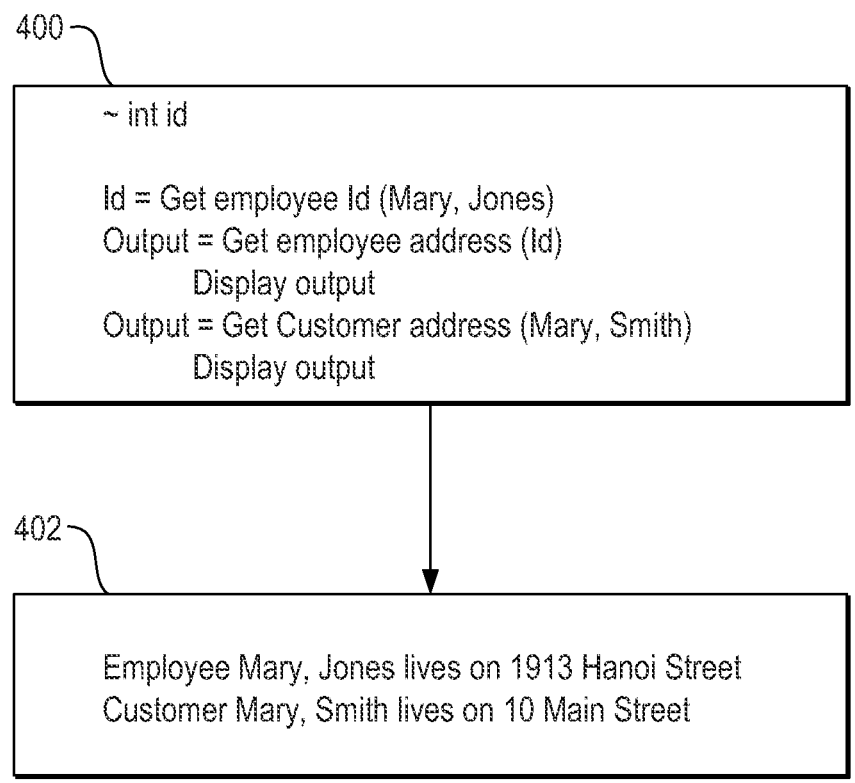
FIG. 4 is a working example of code generated in response to a natural language query.

Operation:

One working example of a system and method to process natural language queries is illustrated in FIGS. 2-4. In particular, FIG. 2 is a flow diagram in accordance with aspects of the present disclosure. FIGS. 3A-4 present various aspects of natural language processing in accordance with the present disclosure. The actions shown in FIGS. 3A-4 will be discussed below with regard to the flow diagrams of FIG. 2.

As shown in block 202 of FIG. 2, a keyword likely to appear in a natural language query is associated with a module. The module may be one of a plurality of modules likely to provide an accurate answer to the natural language query. Referring now to the example of FIG. 3A, example modules 302, 304, 306, and 308 are shown. The illustrative modules shown in FIG. 3A may be APIs for obtaining customer and employee information of a company. Module 302 may be a module to obtain the employee identifier of an employee whose first name and last name are being entered therein as parameters. Module 304 may obtain the address of an employee whose employee identifier is being entered therein as a parameter. Module 306 may obtain the address of a customer whose first name and last name are being entered therein as parameters. Finally, module 308 may obtain or otherwise calculate the salary of the employee whose identifier is being entered therein as a parameter. It is understood that the foregoing modules are merely for illustrative purposes and that many other types of modules or APIs may be defined.

Referring now to FIG. 3B, associations between keywords and attributes of the modules are shown. The associations may be stored in computer registers, in a relational database as tables having a plurality of different columns and records, XML documents or flat files. The associations may comprise any information sufficient to identify the relevant data, such as numbers, descriptive text, proprietary codes, references to data stored in other areas of the same memory or different memories (including other network locations) or information that is used by a function to calculate the relevant data.

Association 311 and 312 of FIG. 3B show an association between the keyword "Live" and the modules "Get employee address" and "Get customer address" respectively. Thus, when query translator 114 detects the keyword "Live" the modules "Get employee address" and "Get customer address" may be called upon to provide an answer to the natural language query. Associations 313 and 314 may cause the modules "Get employee address" and "Get customer address" to be called upon when the keyword "Street" is detected in an incoming natural language query. Association 315 associates the keyword "Mary" with the "first name" parameter of "Get employee Id" and the keyword "Jones" with the "last name" parameter of "Get employee Id." The words "Mary" and "Jones" are delimited by a comma. Thus, if either of these keywords is detected, the "Get employee Id" module may be called upon with the "first name" parameter set to "Mary" and the "last name" parameter set to "Jones." Similarly, association 316 associates the keyword "Mary" with the "first name" parameter of the module "Get customer address" and the keyword "Smith" with the "last name" parameter thereof. Thus, detection of "Mary" or "Smith" in an incoming natural language query may cause the "Get customer address" module to be called upon with the "first name" parameter set to "Mary" and the "last name" parameter set to "Smith." Associations 317 and 318 may cause the module "Get employee salary" to be called upon when the keywords "Make" or "Money" are detected. Associations 319 thru 322 may cause the "Get employee address," "Get employee salary," or "Get employee Id" modules to be called upon when the keyword "Employee" is detected in an incoming natural language query. Finally, association 323 may cause the module "Get customer address" to be called upon when the keyword "Customer" is detected in an incoming natural language query. The foregoing example associations shown in FIG. 3B may be used to convert a natural language query into a series of calls to the example modules in FIG. 3A. Once again, the forgoing semantic model is merely for illustrative purposes and it is understood that different words and associations may be arranged therein. Furthermore, as more data is added (e.g., new customer or new employee) new associations may be added to the semantic model of FIG. 3B.

Referring back to FIG. 2, it may be determined whether at least one of the likely keywords determined by indexer 113 appears in a received natural language query, as shown in block 204. In block 206, a response to the received natural language query may be generated with information from each module associated with a likely keyword in the received natural language query. Referring back to the examples in FIGS. 3A-3B, a user may type in a question: "Where does Mary live?" In this example, the word "Mary" and "live" are included in associations 311, 312, 315, and 316. The keyword "Live" is associated with both "Get employee address" and "Get customer address," thus both may be called upon to answer the natural language query. However, the parameters may be determined from the keyword "Mary." Referring now to FIG. 4, block 400 shows example code that may be generated to retrieve an answer to the natural language query "Where does Mary live?" Block 400 first shows a call to the "Get employee Id" module with the "first name" parameter set to "Mary," which was indicated in the natural language query. Since no "last name" was indicated in the query, the "Get employee Id" module may be called with the "last name" parameter set to "Jones," since this is the only other last name for "Mary" in the semantic model associated with "Get employee Id." However, other examples may have various last names for Mary associated with "Get employee Id." The "Get customer address" module may be called with the first and last name parameters set to "Mary" and "Smith" in accordance with association 316. Block 400 in FIG. 4 also shows a call to "Get employee address" in accordance with its association with the keyword "Live." The identifier returned from "Get employee Id" is used as a parameter for "Get employee address."

In block 402, the answers generated by the code in block 400 are shown. The first answer is the address of the employee Mary Jones. This may be chosen as the first answer based on previous indications that this was the correct answer when the query "What is Mary's address?" was received in the past. When a user clicks on an answer, language learner 116 may keep track of the answers that a user selects in order to determine a probability. The second answer is the address of the customer "Mary Smith."

CONCLUSION

Advantageously, the above-described system, method, and non-transitory computer readable medium convert natural language queries into computer code that calls upon modules to obtain answers to the query. In this regard, the answers may be obtained despite having no knowledge of the structure of the database in which the data is stored. Furthermore, answers to natural language queries may be generated even if the modules calculate the data in real-time rather than querying a database.

Although the disclosure herein has been described with reference to particular examples, it is to be understood that these examples are merely illustrative of the principles of the disclosure. It is therefore to be understood that numerous modifications may be made to the examples and that other arrangements may be devised without departing from the spirit and scope of the disclosure as defined by the appended claims. Furthermore, while particular processes are shown in a specific order in the appended drawings, such processes are not limited to any particular order unless such order is expressly set forth herein. Rather, processes may be performed in a different order or concurrently, and steps may be added or omitted.

The invention claimed is:

1. A system comprising:
at least one processor;
an indexer which, upon execution, causes the at least one processor to determine, based on source code text of a plurality of program modules, which keywords are likely to appear in a natural language query and to associate each keyword of the keywords with a program module of the plurality of program modules that are executable to obtain data in response to natural language queries;
a language learner which, upon execution, causes the at least one processor to alter an association between a keyword of the keywords and a program module of the plurality of program modules, in response to determining that the altered association is more likely to trigger an accurate response to a natural language query;
a query translator which, upon execution, causes the at least one processor to determine whether at least one determined keyword of the keywords determined by the indexer appears in a received natural language query; and
a results generator which, upon execution, causes the at least one processor to:
respond to the received natural language query with data generated by each program module, of the plurality of program modules, that is associated with the at least one determined keyword appearing in the received natural language query, and
rank the data returned by each program module associated with the at least one determined keyword based on a probability that the data is a correct response to the received natural language query.

2. The system of claim 1, wherein the probability is at least partially based on a number of associations between each program module associated with the at least one determined keyword and keywords appearing in the received natural language query.

3. The system of claim 1, wherein the probability is at least partially based on an amount of information returned by each program module associated with the at least one determined keyword.

4. The system of claim 1, wherein the indexer, upon execution, further causes the at least one processor to associate each keyword of the keywords with an attribute of a program module of the plurality of program modules based on metadata associated with each attribute.

5. A non-transitory computer-readable medium storing instructions that upon execution cause at least one processor to:
   determine keywords likely to appear in natural language queries, the determining based on source code text of application programming interface (API) modules executable in response to the natural language queries to obtain data;
   associate each of the determined keywords with a respective API module of the API modules;
   alter an association between a determined keyword of the determined keywords and a respective API module of the API modules, in response to determining that the altered association is more likely to trigger an accurate response to a natural language query of the natural language queries;
   determine whether at least one determined keyword of the determined keywords appears in a received natural language query;
   respond to the received natural language query with data produced by each API module, of the API modules, that is associated with the at least one determined keyword that appears in the received natural language query; and
   rank the data returned by each API module associated with the at least one determined keyword based on a probability that the data is a correct response to the received natural language query.

6. The non-transitory computer-readable medium of claim 5, wherein the probability is at least partially based on a number of associations between each API module associated with the at least one determined keyword and keywords appearing in the received natural language query.

7. The non-transitory computer-readable medium of claim 5, wherein the probability is at least partially based on an amount of information returned by each API module associated with the at least one determined keyword.

8. The non-transitory computer-readable medium of claim 5, wherein the instructions stored in the computer-readable medium, when executed, further cause the at least one processor to associate each determined keyword of the determined keywords with an attribute of an API module of the API modules based on metadata associated with each attribute.

9. A method comprising:
   determining, using at least one processor, keywords that are likely to appear in natural language queries, the determining of the keywords based on source code text of program modules executable to obtain data from a data structure in response to the natural language queries;
   associating, using the at least one processor, each determined keyword with a program module of the program modules;
   changing, using the at least one processor, an association between a determined keyword and a program module, in response to determining that changing the association is more likely to trigger an accurate response to a natural language query of the natural language queries;
   determining, using the at least one processor, whether at least one determined keyword of the determined keywords appears in a received natural language query;
   generating, using the at least one processor, a response to the received natural language query with data produced by each respective program module, of the program modules, that is associated with the at least one determined keyword appearing in the received natural language query; and
   ranking, using the at least one processor, the data returned by each respective program module associated with the at least one determined keyword based on a probability that the data returned is a correct response to the received natural language query.

10. The method of claim 9, wherein the probability is at least partially based on a number of associations between each respective program module associated with the at least one determined keyword and determined keywords appearing in the received natural language query.

11. The method of claim 9, wherein the probability is at least partially based on an amount of information returned by each respective program module associated with the at least one determined keyword.

12. The method of claim 9, wherein associating each determined keyword with a program module of the program modules comprises associating, using the at least one processor, each determined keyword with an attribute of a program module of the program modules likely to provide accurate answers to the natural language queries based on metadata associated with each attribute.

13. The system of claim 1, wherein the program modules are application programming interface (API) modules, and the determining of the keywords is based on processing the source code text of the API modules.

14. The system of claim 1, wherein the results generator is to execute each program module associated with the at least one determined keyword to obtain data from a data structure that stores data in a format not obtainable by a structured query language (SQL).

15. The non-transitory computer-readable medium of claim 5, wherein the instructions when executed cause the at least one processor to execute each API module associated with the at least one determined keyword to obtain data from a data structure that stores data in a format not obtainable by a structured query language (SQL).

16. The method of claim 9, further comprising executing each program module associated with the at least one determined keyword to obtain data from a data structure that stores data in a format not obtainable by a structured query language (SQL).

17. The method of claim 9, wherein the program modules are application programming interface (API) modules, and wherein the determining of the keywords is based on analyzing the source code text of the API modules.

* * * * *